(12) United States Patent
Kondou et al.

(10) Patent No.: US 10,974,658 B2
(45) Date of Patent: Apr. 13, 2021

(54) IMAGE DISPLAY CONTROL DEVICE

(71) Applicant: Calsonic Kansei Corporation, Saitama (JP)

(72) Inventors: Daisuke Kondou, Saitama (JP); Hisashi Yamaguchi, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 57 days.

(21) Appl. No.: 16/470,846

(22) PCT Filed: Oct. 12, 2017

(86) PCT No.: PCT/JP2017/036972
§ 371 (c)(1),
(2) Date: Jun. 18, 2019

(87) PCT Pub. No.: WO2018/116588
PCT Pub. Date: Jun. 28, 2018

(65) Prior Publication Data
US 2019/0322222 A1    Oct. 24, 2019

(30) Foreign Application Priority Data

Dec. 22, 2016 (JP) .............................. JP2016-248684
May 16, 2017 (JP) .............................. JP2017-097276

(51) Int. Cl.
*H04N 7/18* (2006.01)
*B60R 11/02* (2006.01)
(Continued)

(52) U.S. Cl.
CPC .......... *B60R 11/0235* (2013.01); *B60R 1/007* (2013.01); *B60R 1/025* (2013.01);
(Continued)

(58) Field of Classification Search
CPC ................. B60R 11/0235; B60R 1/007; B60R 2001/1253; B60R 2300/306; G08G 1/167; H04N 5/232935
(Continued)

(56) References Cited

U.S. PATENT DOCUMENTS

2012/0050334 A1* 3/2012 Velthoven ................. G06T 7/44
  345/660
2015/0281587 A1* 10/2015 Furuta ...................... B60R 1/00
  348/240.2
(Continued)

FOREIGN PATENT DOCUMENTS

CN       105857179 A    8/2016
JP       2006135797 A   5/2006
(Continued)

*Primary Examiner* — Fabio S Lima
(74) *Attorney, Agent, or Firm* — Young Basile Hanlon & MacFarlane, P.C.

(57) ABSTRACT

An image display control device displays, on a monitor, images of the periphery of a vehicle that are captured by a left camera and a right camera installed in the vehicle. The device includes: a vehicle detection unit which detects another vehicle from the images captured by the left camera and the right camera; an enlargement unit which, when the other vehicle is detected by the vehicle detection unit, subjects the images captured by the left camera and the right camera to enlargement processing on the basis of a delay time the images take to be displayed on the monitor; and an output unit which outputs the images subjected to the enlargement processing by the enlargement unit to the monitor.

15 Claims, 17 Drawing Sheets

DELAY IMAGE

REAL-TIME IMAGE

(51) Int. Cl.
    *G08G 1/16*         (2006.01)
    *B60R 1/00*         (2006.01)
    *B60R 1/02*         (2006.01)
    *B60R 1/12*         (2006.01)
    *B60R 11/00*       (2006.01)

(52) U.S. Cl.
    CPC ............ *G08G 1/163* (2013.01); *G08G 1/167* (2013.01); *H04N 7/18* (2013.01); *B60R 2001/1253* (2013.01); *B60R 2011/0005* (2013.01)

(58) Field of Classification Search
    USPC ........................................................ 348/118
    See application file for complete search history.

(56) References Cited

U.S. PATENT DOCUMENTS

| | | | |
|---|---|---|---|
| 2016/0221604 A1* | 8/2016 | Yamaoka | B62D 15/025 |
| 2016/0227098 A1 | 8/2016 | Yasuhara et al. | |
| 2018/0053058 A1* | 2/2018 | Konishi | H04N 7/183 |
| 2018/0357903 A1* | 12/2018 | Fukunaga | G08G 1/166 |
| 2019/0168757 A1* | 6/2019 | Tokimasa | B60W 30/18163 |

FOREIGN PATENT DOCUMENTS

| | | | | |
|---|---|---|---|---|
| JP | 200868827 A | 3/2008 | | |
| JP | 2010118935 A | 5/2010 | | |
| JP | 2010245859 A | 10/2010 | | |
| WO | WO-2009104226 A1 * | 8/2009 | ........... | G09G 3/3611 |
| WO | 2015045578 A1 | 4/2015 | | |
| WO | 2016163094 A1 | 10/2016 | | |

\* cited by examiner

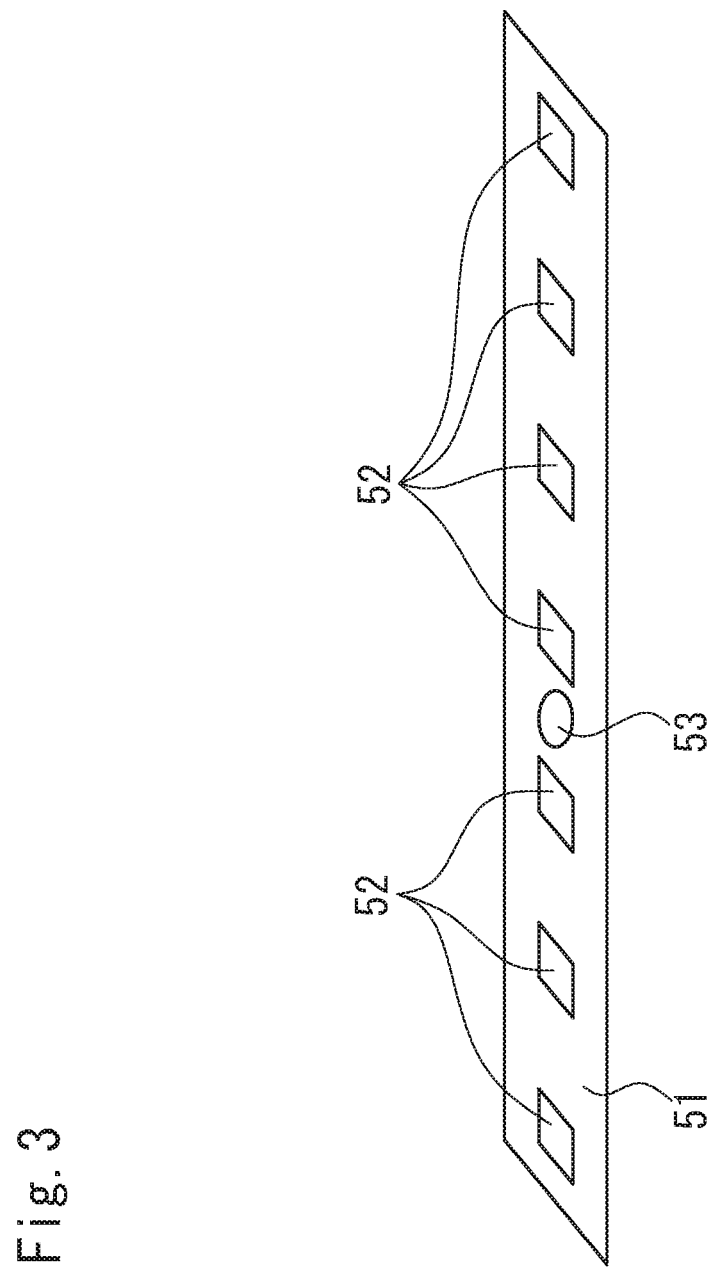

Fig. 20
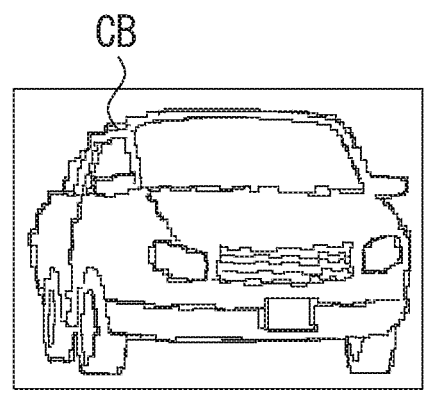
IMAGE CORRECTION
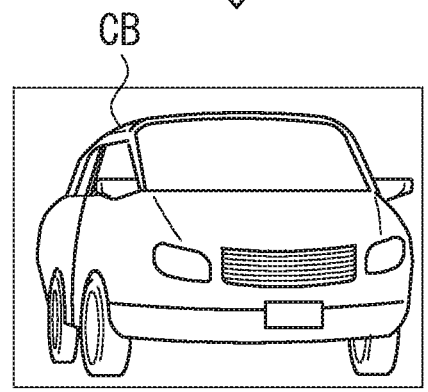

IMAGE DISPLAY CONTROL DEVICE

CROSS REFERENCE TO RELATED APPLICATIONS

The present application is based on Japanese Patent Application No. 2016-248684 filed Dec. 22, 2016, and Japanese Patent Application No. 2017-097276 filed May 16, 2017, the entire contents of which are herein incorporated by reference.

TECHNICAL FIELD

The present invention relates to an image display control device.

BACKGROUND

In order to support to check the rear and side when a driver drives a vehicle, the vehicle is provided with door mirrors. As an alternative to or in combination with using door mirrors, it is proposed to capture the rear and side of the vehicle by a camera and display captured images on a monitor installed in a dashboard (see, for example, JP 2008-68827A).

SUMMARY

The images displayed by the monitor delays with respect to real-time images, due to a delay time required for displaying the images captured by the camera on the monitor. The driver checks the images on the monitor at the time of operations such as lane change, to check the approaching state of other vehicle in a change destination lane. If the images displayed by the monitor delays, it is difficult to grasp the approaching state of other vehicle. It is required to display images on a monitor in consideration of a delay time to improve safety in driving.

The present invention relates to an image display control device. The image display control device displays images of surroundings of a host vehicle in which the images are captured by a camera installed in the host vehicle, on a monitor and includes: a vehicle detection unit that detects the other vehicle from image captured by the camera; an enlargement unit that applies, when the vehicle detection unit detects the other vehicle, an enlargement processing to the images based on a delay time required for displaying the image captured by the camera on the monitor; and an output unit that outputs to the monitor the image obtained by the enlargement processing performed by the enlargement unit.

By the present invention, it is possible to make the size of the image to be displayed by the monitor of the other vehicle in the delay image closer to the size of that in the real-time image, thereby improving the safety in driving.

BRIEF DESCRIPTION OF THE DRAWINGS

FIG. 3 is a diagram illustrating a configuration of an LED backlight board of a monitor;

FIG. 20 is a diagram illustrating image correction by an image correction unit.

DETAILED DESCRIPTION

Figure 1:
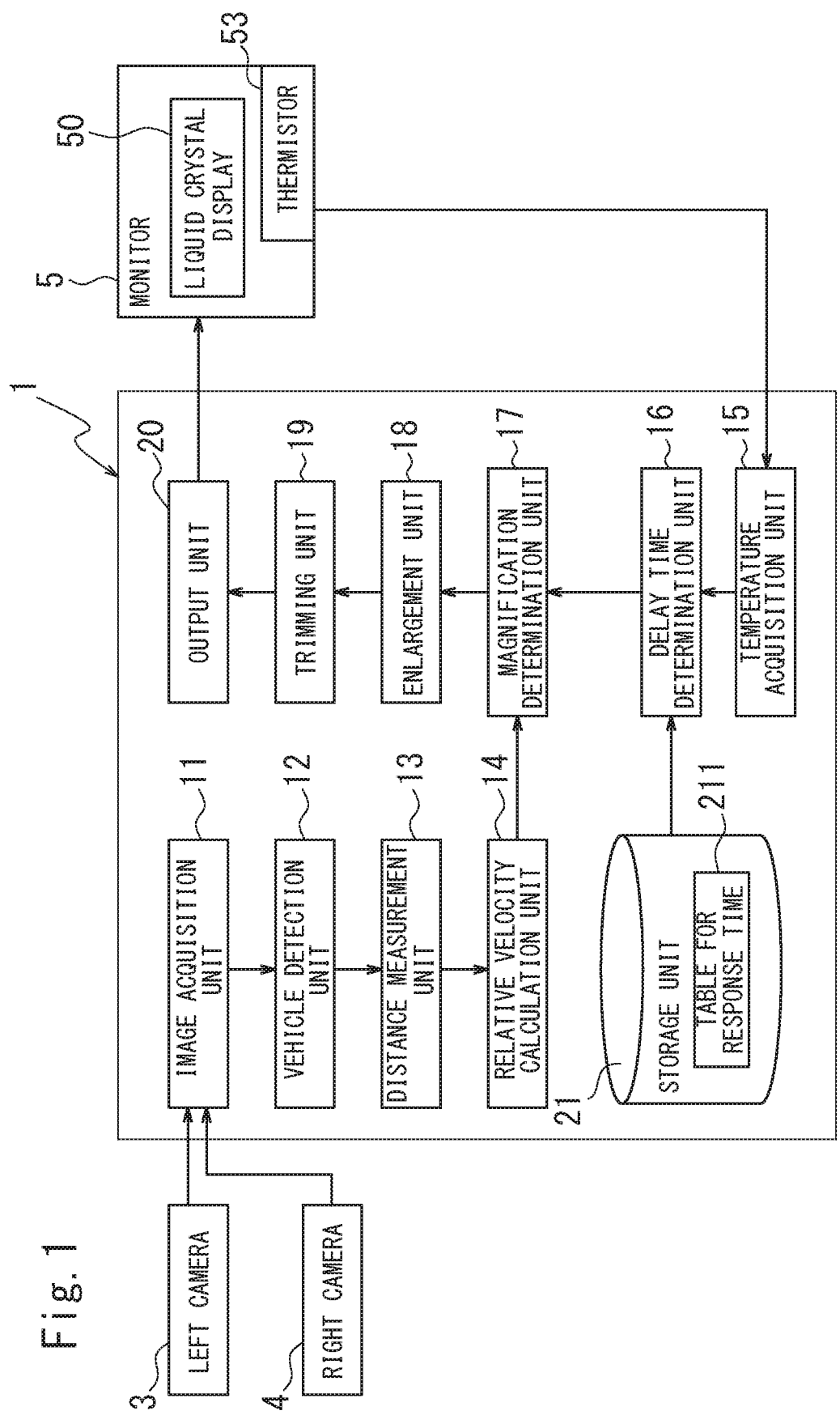
FIG. 1 is a block diagram illustrating the configuration of the image display control device according to an embodiment.
Figure 2:
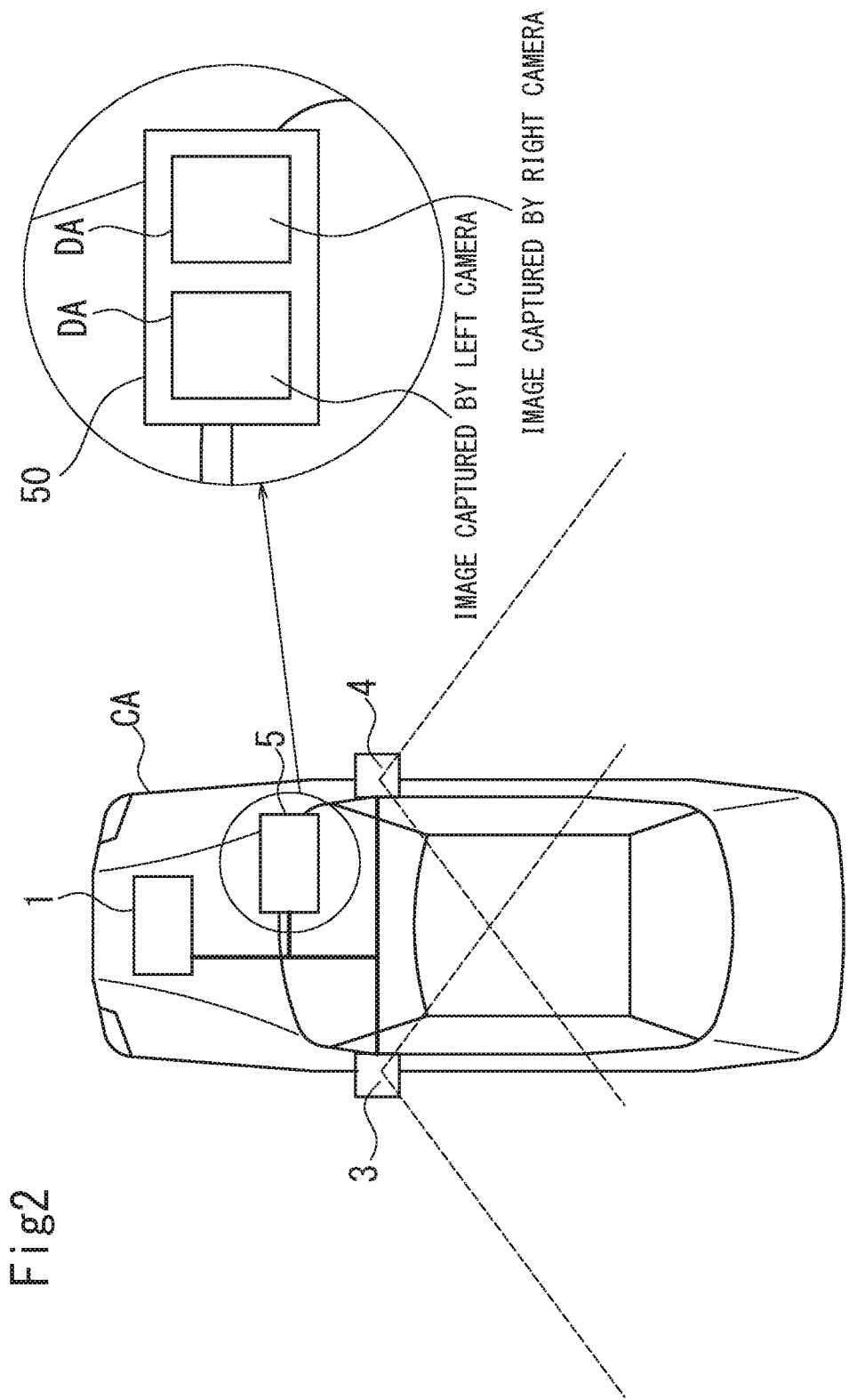
FIG. 2 is a schematic diagram illustrating an installation state of the image display control device on a host vehicle.

In the following, an image display control device according to an embodiment of the present invention will be described with reference to the drawings. FIG. 1 is a block diagram illustrating the configuration of the image display control device. FIG. 2 is a schematic diagram illustrating an installation state of the image display control device on a vehicle.

[Configuration]

As illustrated in FIGS. 1 and 2, the image display control device 1 is installed inside the vehicle and connected to a left camera 3, a right camera 4, and a monitor 5. The image display control device 1 displays images of surroundings of the vehicle captured by the left camera 3 and the right camera 4 on the monitor 5. As will be described in detail later, the image display control device 1 applies enlargement processing to the image, in order to make a delay image displayed by the monitor 5 closer to a real-time image.

Hereinafter, the host vehicle on which the image display control device 1 according to the embodiment is installed and the left camera 3 and the right camera 4 captures is referred to as the "host vehicle CA". A vehicle other than the host vehicle CA displayed by the images captured by the left camera 3 and the right camera 4 is referred to as the "other vehicle".

In FIG. 2, each imaging range of the left camera 3 and the right camera 4 is indicated with broken lines. The left camera 3 is installed on the left front door of the host vehicle CA. The left camera 3 captures the side and rear of the left side of the host vehicle CA. The right camera 4 is installed on a front door on the right side of the host vehicle CA. The right camera 4 captures the side and rear of the right side of the host vehicle CA. The left camera 3 and the right camera 4 constantly capture while the host vehicle is traveling.

The monitor 5 is installed on a dashboard of the driver's seat inside the vehicle. The monitor 5 includes a liquid crystal display 50 that displays images captured by the left camera 3 and the right camera 4. As illustrated in FIG. 2, the monitor 5 includes one liquid crystal display 50, and two images captured by the left camera 3 and the right camera 4 may be displayed side by side on the one liquid crystal display 50. Alternatively, the monitor 5 includes two liquid crystal displays 50, and images captured by the left camera 3 and the right camera 4 may be respectively displayed. The monitor 5 has a display area DA of a certain size for each image captured by the left camera 3 and the right camera 4.

As illustrated in FIG. 1, the monitor 5 includes a thermistor 53 as a temperature measurement unit for measuring the temperature of the liquid crystal display 50.

FIG. 3 is a diagram illustrating the configuration of an LED backlight board 51 of the monitor 5 including the thermistor 53. The LED backlight board 51 is provided with LEDs 52 that illuminate the liquid crystal display 50, at intervals from each other. The thermistor 53 is disposed at the center of the LED backlight board 51.

As illustrated in FIG. 1, the image display control device 1 includes an image acquisition unit 11, a vehicle detection unit 12, a distance measurement unit 13, a relative velocity calculation unit 14, a temperature acquisition unit 15, a delay time determination unit 16, an magnification determination unit 17, an enlargement unit 18, a trimming unit 19, an output unit 20, and a storage unit 21. The image display control device 1 includes, for example, a central processing unit (CPU) including a memory, such as a random-access memory (RAM) and a read-only memory (ROM).

The storage unit 21 stores various types of information necessary for processing in the image display control device 1. The storage unit 21 stores, for example, a table for response time 211.

The image acquisition unit 11 acquires images captured by the left camera 3 and the right camera 4. As described above, the left camera 3 and the right camera 4 constantly capture while the vehicle is traveling. The image acquisition unit 11 sequentially acquires images of the captured frames while the left camera 3 and the right camera 4 perform capturing.

The vehicle detection unit 12 detects the other vehicle from the image acquired by the image acquisition unit 11. The distance measurement unit 13 measures the inter-vehicle distance D between the other vehicle detected by the vehicle detection unit 12 and the host vehicle CA. The relative velocity calculation unit 14 calculates a relative velocity Vr of the other vehicle with respect to the host vehicle CA based on the inter-vehicle distance D measured by the distance measurement unit 13.

Images captured by the left camera 3 and the right camera 4 are different from each other. The vehicle detection unit 12 detects the other vehicle with respect to each of the images captured by the left camera 3 and the image of the right camera 4. When the vehicle detection unit 12 detects the other vehicle in both images, the distance measurement unit 13 and the relative velocity calculation unit 14 calculate the inter-vehicle distance D and the relative velocity Vr with respect to the other vehicle in each image.

The temperature acquisition unit 15 acquires the temperature of the liquid crystal display 50 measured by the thermistor 53 on the monitor 5. The delay time determination unit 16 determines the delay time ΔTcd based on the temperature of the liquid crystal display 50 acquired by the temperature acquisition unit 15. The delay time ΔTcd is a time required for displaying the respective images captured by the left camera 3 and the right camera 4 on the monitor. The delay time determination unit 16 refers to the response time table 211 stored in the storage unit 21 when determining the delay time ΔTcd.

The temperature of the liquid crystal display 50 changes every moment. Thus, while the vehicle is traveling, the temperature acquisition unit 15 acquires the temperature of the liquid crystal display 50 at a predetermined interval. The delay time determination unit 16 determines each time the temperature acquisition unit 15 acquires the temperature of the liquid crystal display 50, determines and updates the delay time ΔTcd. The temperature measurement interval may be appropriately determined in consideration of the temperature change tendency of the liquid crystal display 50, a load of data transmission, and the like.

The magnification determination unit 17 determines a magnification rate Z for enlargement of an image based on the inter-vehicle distance D, the relative velocity Vr, and the delay time ΔTcd. When the vehicle detection unit 12 detects the other vehicle from both images captured by the left camera 3 and the right camera 4, the magnification determination unit 17 calculates a magnification based on the inter-vehicle distance D and the relative velocity Vr of each other vehicle. The magnification determination unit 17 determines the larger one of the calculated magnifications as the final magnification rate Z.

As an enlargement processing of the image, the enlargement unit 18 enlarges the entire image acquired by the image acquisition unit 11 to the magnification rate Z determined by the magnification determination unit 17. The trimming unit 19 trims the enlarged image enlarged by the enlargement unit 18 in accordance with the display area DA of the monitor 5. The output unit 20 outputs the image trimmed by the trimming unit 19 to the monitor 5.

[Operation]

As described above, the image display control device 1 outputs images of surroundings of the host vehicle CA captured by the left camera 3 and the right camera 4 to the monitor 5 and displays thereon. The image displayed on the monitor 5 delays with respect to the real-time image, due to the delay time ΔTcd required for displaying the images captured by the cameras on the monitor 5.

Figure 4B:
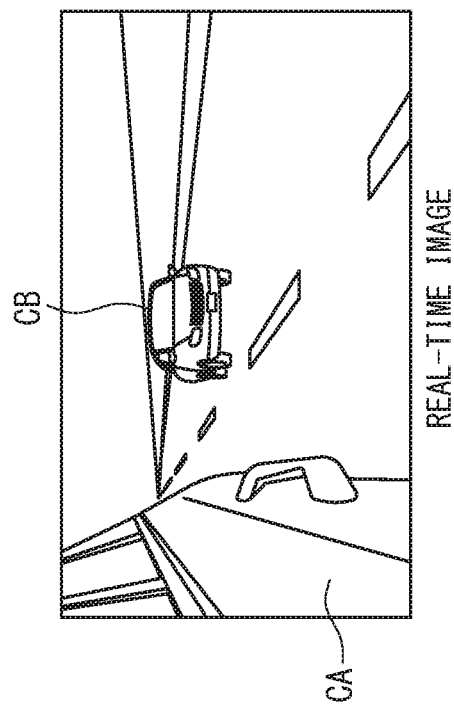
FIG. 4B is a view illustrating a real-time image.
Figure 4A:
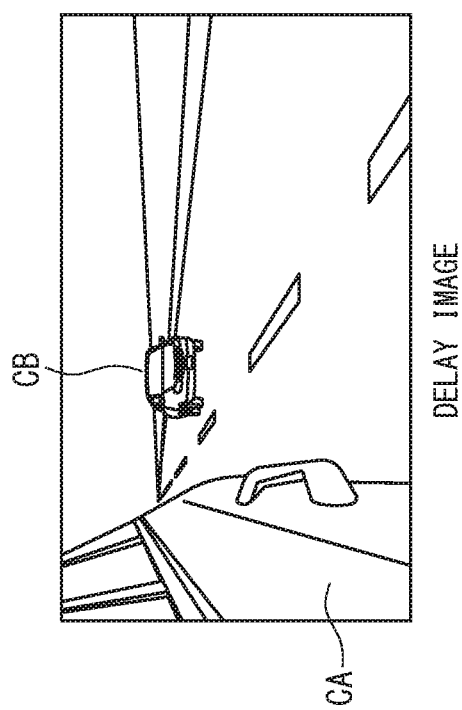
FIG. 4A is a diagram illustrating a delay image when the relative velocity of other vehicle is 100 km/h.

FIG. 4 illustrates a specific example. FIG. 4 illustrates an example in which, in an image captured by the left camera 3, other vehicle is displayed, the other vehicle traveling at a relative velocity of 100 km/h from the rear of the host vehicle CA in a lane adjacent to that of the host vehicle CA. FIG. 4 illustrates an example in which the delay time ΔTcd is 200 msec. FIG. 4A illustrates an image displayed on the monitor 5, that is, a delay image. FIG. 4B illustrates an image captured by the left camera 3 in real time. Since the other vehicle is approaching the host vehicle CA, the displayed image of the other vehicle in the real-time image is larger than that in the delay image.

The driver sensitively grasps the degree of approach of the other vehicle based on the size of the other vehicle in the image. Even in the delay image, the size of the image to be displayed of the other vehicle is made closer to the size of that in the real-time image, so that the driver can easily grasp the approaching state of the other vehicle. The image display control device 1, in order to make the other vehicle displayed in the delay image close to that in the real-time image, applies an enlargement processing to the image.

Processing to be performed by the image display control device 1 will be described below.

Figure 5:
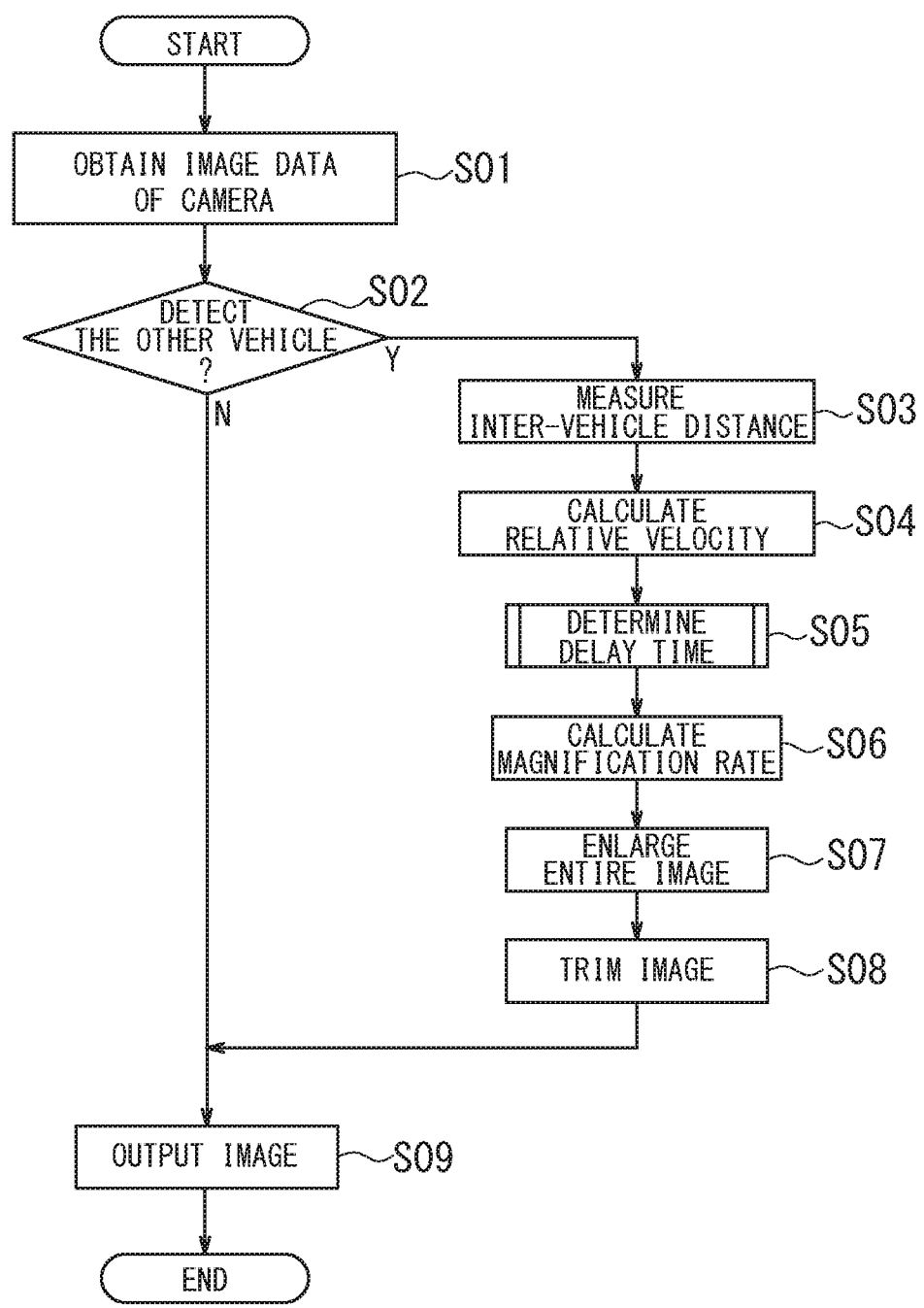
FIG. 5 is a flowchart illustrating a processing of the image display control device according to the embodiment.

FIG. 5 is a flowchart illustrating a processing to be performed by the image display control device 1.

The image acquisition unit 11 acquires each image captured by the left camera 3 and the right camera 4 (step S01). The vehicle detection unit 12 detects other vehicle from the images acquired by the image acquisition unit 11 (step S02). The vehicle detection unit 12, for example, performs filtering on the image to detect an edge and performs template matching on the detected edge, thereby detecting the other vehicle.

When the vehicle detection unit 12 detects the other vehicle from the image (step S02: Yes), the vehicle detection unit 12 measures and inputs to the distance measurement unit 13 the vehicle width W and the position of the other vehicle on the image as the detection result. When the vehicle detection unit 12 does not detect the other vehicle from the image (step S02: No), the output unit 20 outputs the image as it is to the monitor 5 to be displayed (step S09) without applying the enlargement processing to the image.

Figure 6:
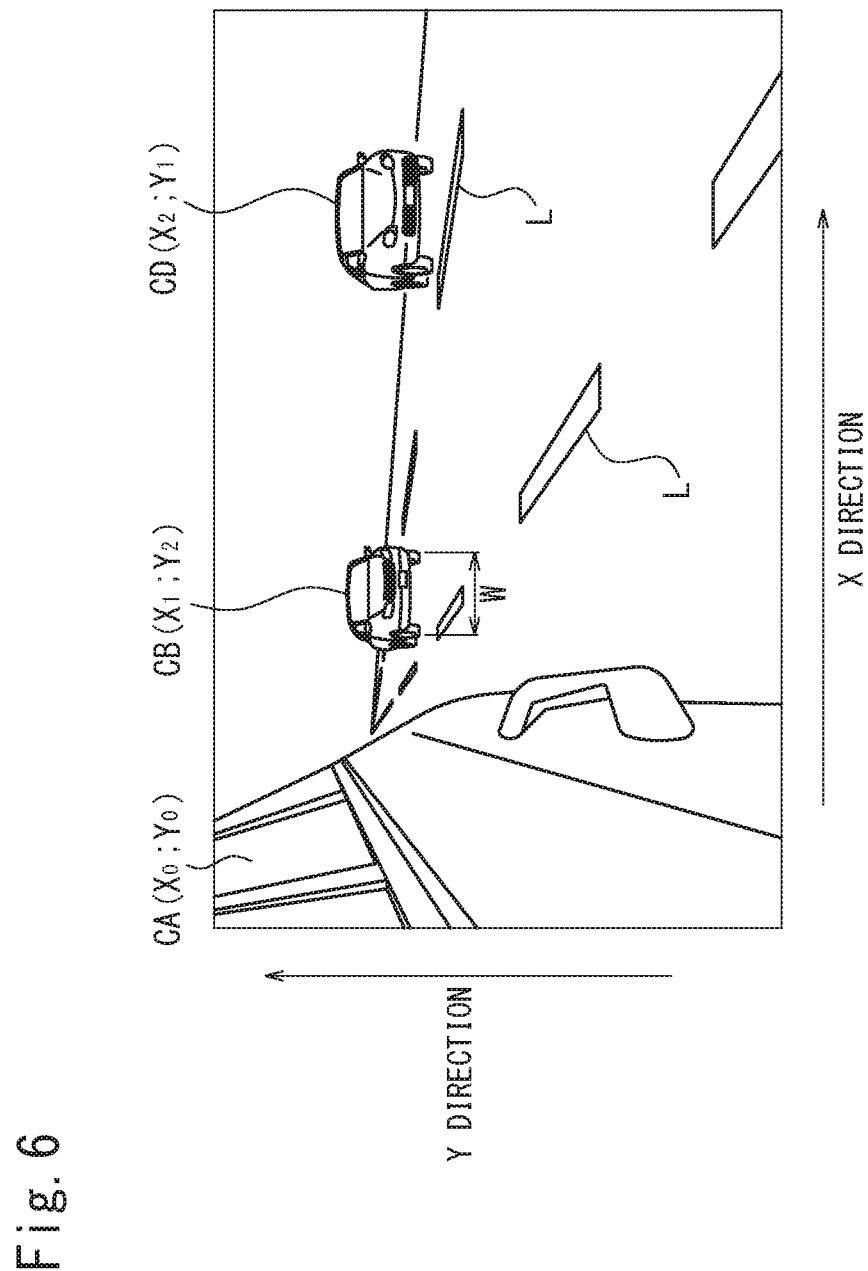
FIG. 6 is a diagram illustrating an example of a processing of detecting other vehicle from image.

FIG. 6 is a diagram illustrating an example of a processing of detecting other vehicle from an image.

FIG. 6 illustrates, as an example, an image captured by the left camera 3. The vehicle width W on the image means the number of pixels [px] in the X direction of the vehicle. The position of the other vehicle on the image is gained from the coordinate ($X_i$) in the horizontal direction (X direction) and the coordinate ($Y_i$) in the vertical direction (Y direction) of the image of the center of the other vehicle.

In this regard, the vehicle detection unit 12 may detect a plurality of other vehicles on one image. FIG. 6 illustrates a case where a plurality of other vehicles CB and CD are detected. The other vehicle CB travels in a lane immediately adjacent to that of the host vehicle CA, the other vehicle CD travels in a lane adjacent to the adjacent lane. Considering the distances between the other vehicles CB and CD and the host vehicle CA, the distance in the traveling direction between the other vehicle CD and the host vehicle CA is shorter. However, when performing operations such as lane change, the driver pays attention to the other vehicle traveling in the lane closest to that of the host vehicle CA, that is, the other vehicle CB at a shorter distance in a direction orthogonal to the traveling direction thereof. Thus, when detecting a plurality of other vehicles CB and CD, the vehicle detection unit 12 selects the other vehicle CB closest to the host vehicle CA in a direction orthogonal to the traveling direction of the host vehicle CA.

As a specific processing, first, the vehicle detection unit 12 measures the position ($X_1$; $Y_2$) of the other vehicle CB on the image and the position ($X_2$; $Y_1$) of the other vehicle CD. The X direction of the image is close to a direction orthogonal to the traveling direction of the host vehicle CA. Thus, the vehicle detection unit 12 selects the other vehicle CB having the coordinate closest to the coordinate ($X_0$; $Y_0$) of the host vehicle CA in the X direction. Note that the processing of selecting the other vehicle CB closest to the host vehicle CA is not limited to this. For example, the vehicle detection unit 12 may detect a lane line L that separates lanes from the image, and select the vehicle traveling in the lane closest to the host vehicle CA. The vehicle detection unit 12 measures and inputs to the distance measurement unit 13 the vehicle width W of the selected other vehicle CB together with the already measured position ($X_1$; $Y_2$) thereof.

Only the detection processing on the image captured by the left camera 3 has been described herein, but the same processing is performed also on the image captured by the right camera 4. The processing on the image captured by the left camera 3 is basically described below, the same processing is performed also on the image captured by the right camera 4 unless otherwise specified. The position ($X_i$; $Y_i$) of the other vehicle measured by the vehicle detection unit 12 is not used until a processing of a trimming unit 19 to be described later. For this reason, although not specifically mentioned, the relative velocity calculation unit 14, the magnification determination unit 17, and the enlargement unit 18 output the position ($X_i$; $Y_i$) of the other vehicle measured by the vehicle detection unit 12 together with the processing results of the respective units.

The distance measurement unit 13 measures the inter-vehicle distance D between the host vehicle CA and the other vehicle CB by using the vehicle width W in the image of the other vehicle CB input by the vehicle detection unit 12 (step S03).

Figure 7B:
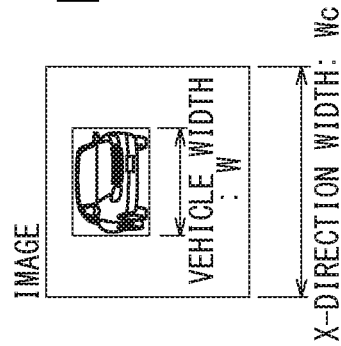
FIG. 7B is a schematic diagram illustrating a relationship between a vehicle width and an X direction width in an image.
Figure 7A:
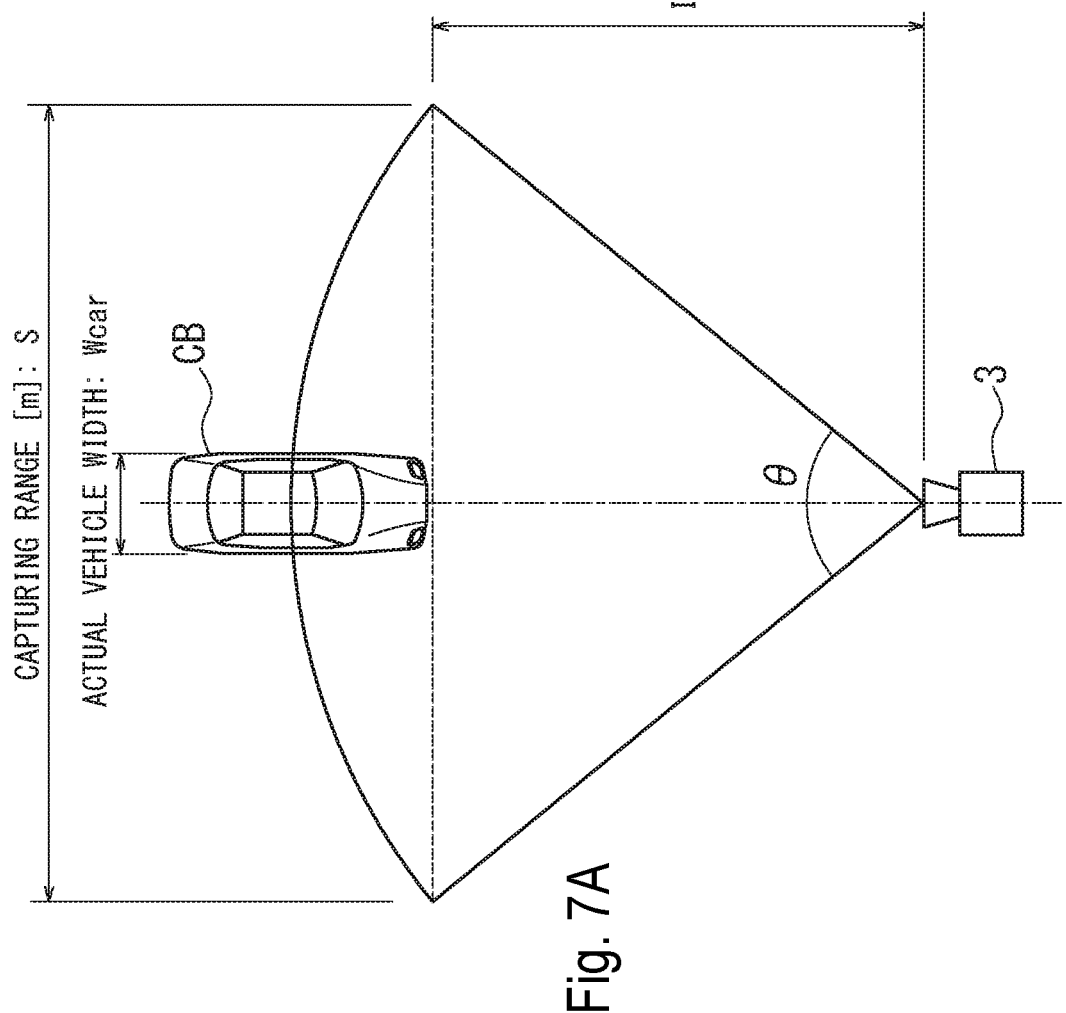
FIG. 7A is a schematic diagram illustrating a relationship between a capturing range, an actual vehicle width, and an inter-vehicle distance.

FIG. 7A is a schematic diagram illustrating the relationship between the capturing range S of the left camera 3, the actual vehicle width Wcar, and the inter-vehicle distance D. FIG. 7B is a schematic diagram illustrating the relationship between the vehicle width W and the X-direction width Wc of an image in an image.

As illustrated in FIG. 7A, when the other vehicle CB enters the capturing range S of the left camera 3, as illustrated in FIG. 7B, the image shows the other vehicle CB. The relationship between the capturing range S [m] of the left camera 3 and the actual vehicle width Wcar[m] of the other vehicle CB corresponds to the relationship between the X-direction width [px] of the image and the vehicle width W[px] in the image, thus the following equation is established.

[Equation 1]

$$\frac{Wcar}{S} = \frac{W}{Wc} \qquad (1)$$

Meanwhile, when the horizontal field of view of the left camera 3 is θ[°], the following Equation (2) is established for the relationship between the distance between the other vehicle CB and the left camera 3, that is, the inter-vehicle distance D[m] between the other vehicle CB and the host vehicle CA, and the capturing range S[m].

[Equation 2]

$$D = \frac{S}{2*\operatorname{Tan}\left(\frac{\theta}{2}\right)} \qquad (2)$$

From Equations (1) and (2), the following relational Equation (3) is derived.

[Equation 3]

$$D = \frac{Wcar * Wc}{W * 2 * \text{Tan}\left(\frac{\theta}{2}\right)} \quad (3)$$

The actual vehicle width Wcar, the capturing range S of the camera, the X direction width Wc of the image, and the horizontal field of view θ of a camera are determined in advance and stored in the storage unit 21. The actual vehicle width Wcar may be, for example, an average value of the width of the vehicle. Alternatively, different actual vehicle widths Wcar may be set according to a vehicle type, such as a passenger vehicle, a large vehicle, or a two-wheeled vehicle. In this case, when detecting the vehicle, the vehicle detection unit 12 specifies a vehicle type, such as a passenger vehicle, a large vehicle, or a two-wheeled vehicle. The distance measurement unit 13 may use the actual vehicle width Wcar according to the vehicle type specified by the vehicle detection unit 12. The distance measurement unit 13 calculates the inter-vehicle distance D, by performing the calculation by substituting the vehicle width W in the image input by the vehicle detection unit 12 into Equation (3). The distance measurement unit 13 inputs the calculated inter-vehicle distance D to the relative velocity calculation unit 14.

Figure 8:
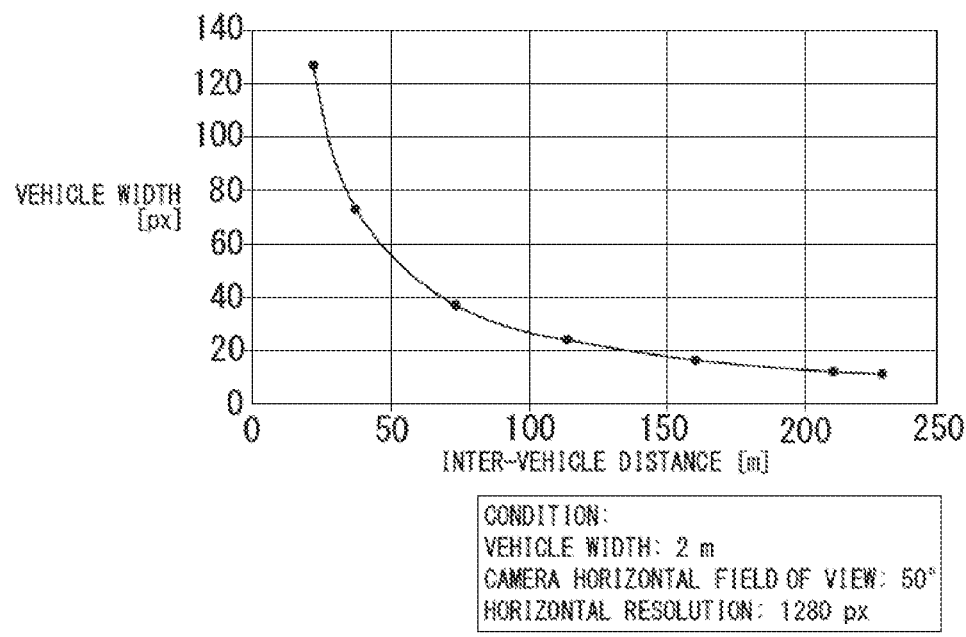
FIG. 8 is a graph illustrating an example of a relationship between the vehicle width and the inter-vehicle distance.

FIG. 8 is a graph illustrating an example of the relationship between the vehicle width W and the inter-vehicle distance D in the image. In FIG. 8, the actual vehicle width Wcar is set 2 m, the X direction width of the image is set 1280 px, and the horizontal field of view of the camera is set 50°. The storage unit 21 may store a table in which the correspondence between the vehicle width W and the inter-vehicle distance D in the image is listed, as illustrated in the graph of FIG. 8. The distance measurement unit 13 may determine the inter-vehicle distance D with reference to the table, as an alternative to performing the calculation of Equation (3) described above.

The relative velocity calculation unit 14 calculates the relative velocity Vr of the other vehicle CB with respect to the host vehicle CA based on the inter-vehicle distance D input by the distance measurement unit 13 (step S04).

Figure 9:
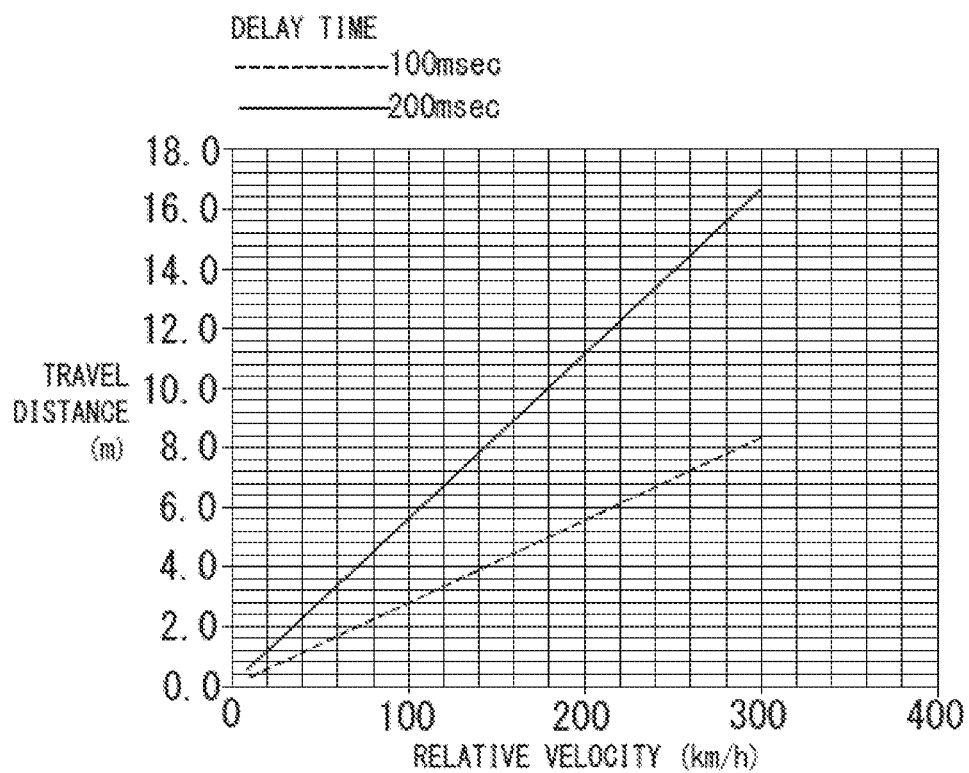
FIG. 9 is a graph illustrating the distance traveled by other vehicle in the delay time for each relative velocity.

FIG. 9 is a graph illustrating the travel distance of the other vehicle CB in the delay time ΔTcd for each relative velocity. In FIG. 9, a case where the delay time ΔTcd is 200 msec is indicated with a solid line, a case where the delay time ΔTcd is 100 msec is indicated with a broken line. This is because if the relative velocity Vr of the other vehicle CB is different, the travel distance of the other vehicle CB is different even at the same delay time ΔTcd. When the travel distance of the other vehicle CB changes, the size of the image of the other vehicle CB in the real-time image also changes. In FIGS. 4(a) and 4(b) described above, an image in a case where the relative velocity Vr is 100 km/h is illustrated. For example, if the relative velocity Vr becomes 200 km/h, the size of the image of the other vehicle CB in the real-time image becomes larger than that of illustrated in FIG. 4B. That is, how much the image is enlarged in order to bring the size of the image of the other vehicle CB displayed in the delay image to that in the real-time image changes according to the relative velocity Vr. Therefore, the relative velocity calculation unit 14 calculates the relative velocity Vr.

The relative velocity calculation unit 14 calculates the relative velocity Vr, using the difference between the two inter-vehicle distances D continuously input by the distance measurement unit 13 and the capturing time difference ΔTf of each frame of the image. As described above, the left camera 3 and the right camera 4 constantly capture while the vehicle is traveling. When detecting a vehicle for a certain frame image in a state in which the other vehicle CB is approaching, the vehicle detection unit 12 sequentially detects the vehicle also for a subsequent frame image, and then measures and inputs to the distance measurement unit 13 each vehicle width W. The distance measurement unit 13 also sequentially measures and inputs to the relative velocity calculation unit 14 the inter-vehicle distance D.

In temporally consecutive frame images, the inter-vehicle distance D between the host vehicle CA and the other vehicle CB changes. For example, in a state in which the other vehicle CB is approaching the host vehicle CA, the inter-vehicle distance Dc measured for a certain frame image is shorter than the inter-vehicle distance Dp measured for a previous frame image. From the difference between the two inter-vehicle distances Dp and Dc and the capturing time difference ΔTf of the frame images, the relative velocity Vr of the other vehicle CB is obtained by the following Equation (4).

[Equation 4]

$$Vr = \frac{Dp - Dc}{\Delta Tf} \quad (4)$$

The capturing time difference ΔTf is determined in advance and stored in the storage unit 21. The relative velocity calculation unit 14 calculates the relative velocity Vr, by performing the calculation of Equation (4) using the two inter-vehicle distances Dp and Dc input continuously in time by the distance measurement unit 13. Moreover, when a certain inter-vehicle distance is input, if there is no inter-vehicle distance input previously, the processing is started after waiting for an input of the next inter-vehicle distance.

The image display control device 1 performs a processing of determining the delay time ΔTcd (step S05). The flowchart of FIG. 5 describes the delay time determination processing after the processing of steps S01 to S04, but the order is not limited to the above. When the vehicle detection unit 12 detects the other vehicle CB from the image in step S02, the delay time determination processing may be proceeded in parallel with the processing of steps S03 to S04. Alternatively, the delay time ΔTcd may be updated by performing the continuous delay time determination processing while the vehicle is traveling.

Figure 10:
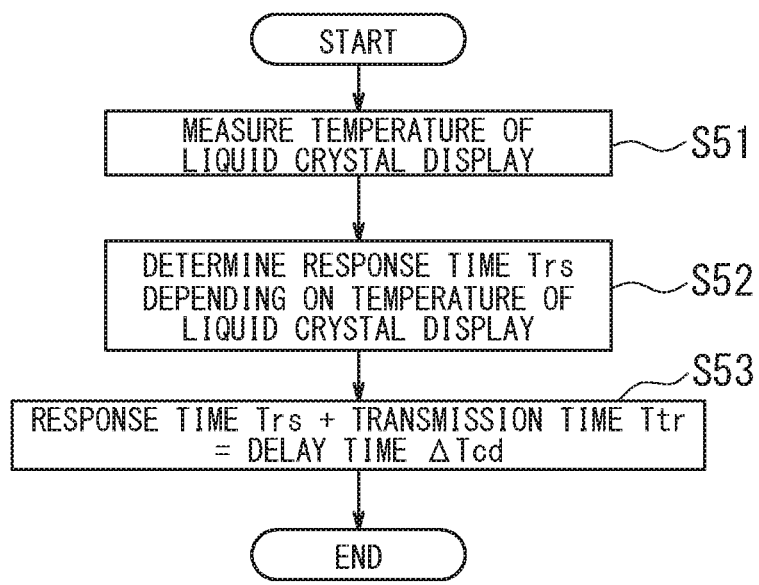
FIG. 10 is a flowchart illustrating details of the delay time determination processing.

FIG. 10 is a flowchart illustrating the details of the delay time determination processing in step S05 in FIG. 5.

Figure 11:
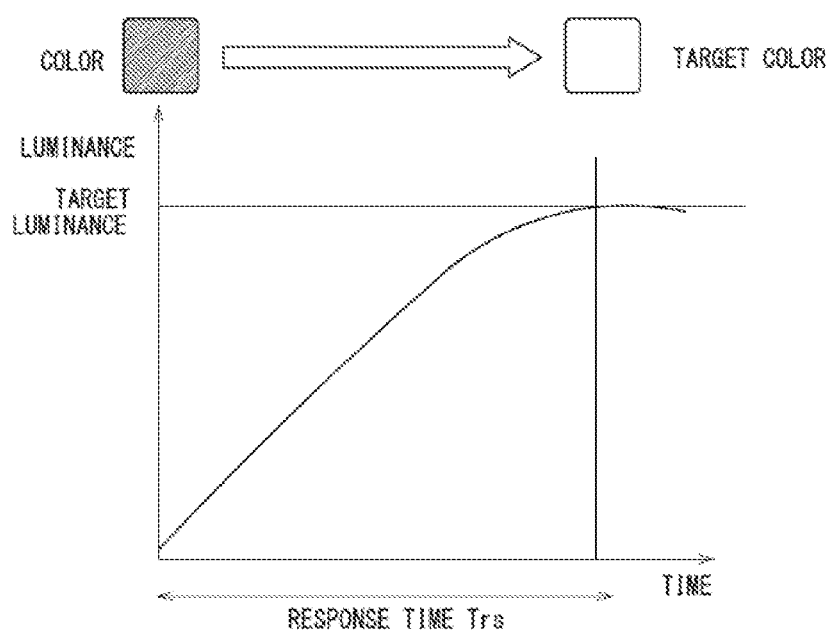
FIG. 11 is a graph illustrating a change in luminance of liquid crystal.

FIG. 11 is a graph illustrating a change in luminance of liquid crystal.

Figures 12, 13:
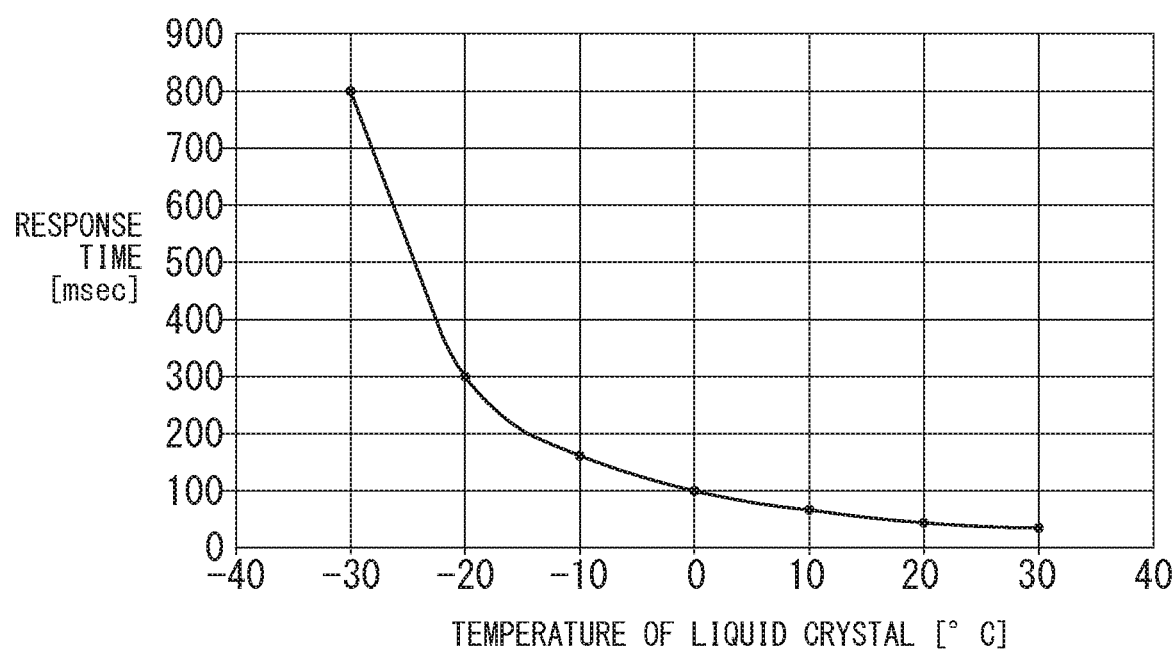
FIG. 12 is a graph illustrating a relationship between liquid crystal temperature and response time.
FIG. 13 is a diagram illustrating an example of a table for response time.

FIG. 12 is a graph illustrating the relationship between the liquid crystal temperature and the response time.

FIG. 13 is a diagram illustrating an example of the table for response time 211.

As illustrated in FIG. 10, the temperature acquisition unit 15 acquires the temperature of the liquid crystal measured by the thermistor 53 of the monitor 5 (step S51). The temperature acquisition unit 15 inputs the acquired temperature of the liquid crystal to the delay time determination unit 16.

As described above, the delay time ΔTcd is the time required for the monitor 5 to display the image after the camera has captured an image. Specifically, the delay time ΔTcd is obtained by adding transmission time Ttr and response time Trs. The transmission time Ttr is the time required for the image display control device 1 to acquire an image from the left camera 3 and the right camera 4 and output the image to the monitor 5. Since the transmission time Ttr is substantially constant, the transmission time Ttr is determined in advance and stored in the storage unit 21.

The response time Trs is time until the liquid crystal display 50 of the monitor 5 reaches the target brightness. The target brightness is the luminance that the driver can determine the color displayed in the image. The response time Trs varies depending on the temperature of the liquid crystal display 50. As illustrated in FIG. 12, the response time Trs tends to become longer as the temperature of the liquid crystal display 50 becomes lower, and to become shorter as the temperature of the liquid crystal display 50 becomes higher. The storage unit stores the correspondence between the temperature of the liquid crystal display 50 and the response time Trs as illustrated in FIG. 12 as a response time table 211. FIG. 13 illustrates an example of the response time table 211. The response time table 211 in FIG. 13 displays the temperature of the liquid crystal display 50 at every 10° C., and the corresponding response time Trs. Since FIG. 13 is merely an example, the interval between the temperatures to be displayed may be smaller than 10° C., or may be larger.

The delay time determination unit 16 refers to the response time table 211 to determine the response time Trs corresponding to the temperature of the liquid crystal display 50 acquired by the temperature acquisition unit 15 (step S52). When the temperature of the liquid crystal display 50 is between the indication temperatures of the response time table 211, the obtained temperature may be rounded up or rounded down to determine the corresponding response time Trs. The delay time determination unit 16 adds the determined response time Trs to the transmission time Ttr to calculate the delay time ΔTcd (step S53).

Returning to FIG. 5, based on the inter-vehicle distance D, the relative velocity Vr, and the delay time ΔTcd of the other vehicle CB, the magnification determination unit 17 determines a magnification rate Z for enlarging the image (step S06).

Figure 14:
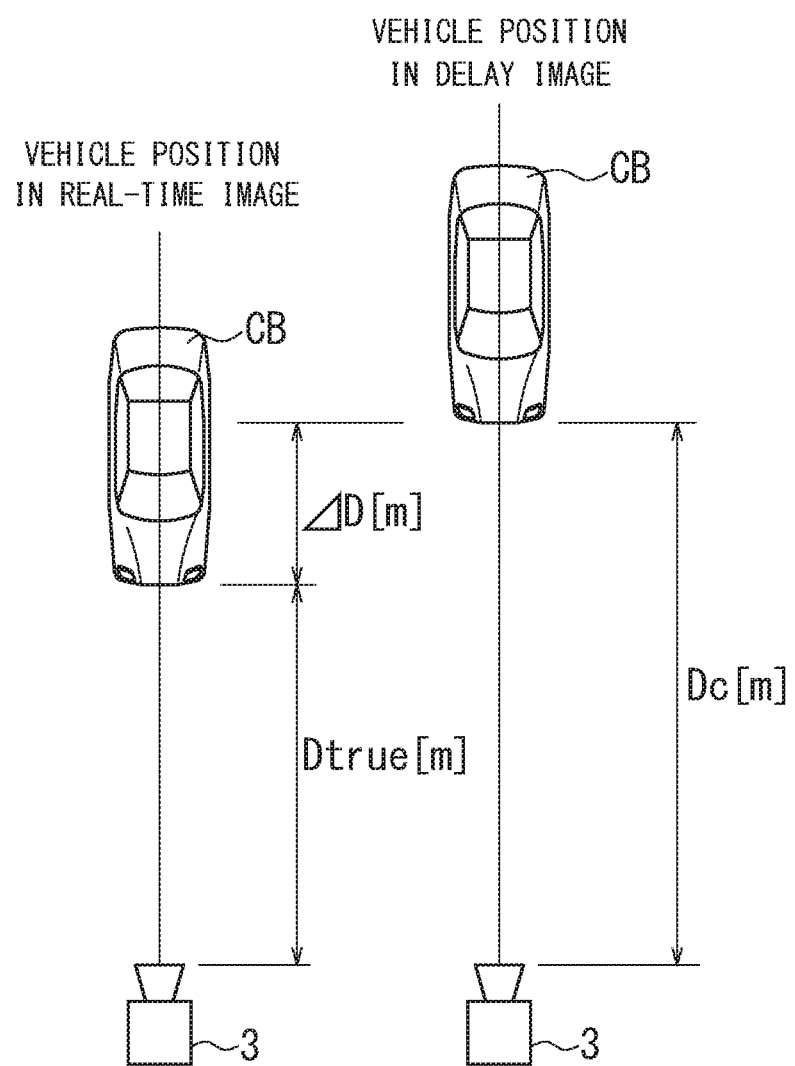
FIG. 14 is a diagram illustrating a relationship between an inter-vehicle distance to other vehicle in an image and an actual inter-vehicle distance to the other vehicle.

FIG. 14 is a diagram for describing the relationship between the inter-vehicle distance D with the other vehicle CB in the delay image displayed by the monitor 5 and the inter-vehicle distance Dtrue of the other vehicle CB in the real-time image.

As illustrated in FIG. 14, when the other vehicle CB approaches the host vehicle CA, the inter-vehicle distance Dtrue in the real-time image is shorter than the inter-vehicle distance D between the other vehicle CB and the host vehicle CA in the delay image. A difference between the inter-vehicle distance D and the inter-vehicle distance Dtrue is ΔD.

The magnification determination unit 17 obtains the difference ΔD from the delay time ΔTcd determined by the delay time determination unit 16 and the relative velocity Vf calculated by the relative velocity calculation unit 14 by using the following Equation (5).

[Equation 5]

$$\Delta D = Vf * \Delta Tcd \tag{5}$$

The magnification determination unit 17 obtains the inter-vehicle distance Dtrue in the real-time image from the difference ΔD obtained from the Equation (5) and the inter-vehicle distance D measured by the distance measurement unit 13 by using the following Equation (6).

[Equation 6]

$$Dtrue = D - \Delta D \tag{6}$$

Here, regarding the inter-vehicle distance Dtrue and the vehicle width Wtrue in the real-time image, the following relational Equation (7) can be derived by using the above formula (3).

[Equation 7]

$$Dtrue = \frac{Wcar * Wc}{Wtrue * 2 * \operatorname{Tan}\left(\frac{\theta}{2}\right)} \tag{7}$$

From Equation (7), the vehicle width Wtrue in the real-time image can be obtained by the following Equation (8).

[Equation 8]

$$Wtrue = \frac{Wcar * Wc}{Dtrue * 2 * \operatorname{Tan}\left(\frac{\theta}{2}\right)} \tag{8}$$

The magnification determination unit 17 calculates the vehicle width Wtrue in the real-time image by performing the calculation of Equation (8) using the inter-vehicle distance Dtrue obtained from Equation (6).

The magnification determination unit 17 obtains the ratio of the vehicle width Wtrue in the real-time image to the vehicle width W in the delay image according to the following Equation (9), and determines the calculated ratio as the magnification rate Z of the image.

[Equation 9]

$$Z = \frac{Wtrue}{W} \tag{9}$$

The magnification determination unit 17 inputs the calculated magnification rate Z to the enlargement unit 18. In both of images captured by the left camera 3 and the right camera 4 at the same timing, if the vehicle detection unit 12 detects different other vehicles, the magnification determination unit 17 calculates a magnification for each of the images. However, be noted, when both the images are enlarged at different magnifications, the driver may feel a sense of incongruity. Therefore, the magnification determination unit 17 determines the larger one of the calculated magnifications as the final magnification rate Z, and inputs it to the enlargement unit 18.

Returning to FIG. 5, the enlargement unit 18 enlarges the entire image acquired by the image acquisition unit 11 with the magnification rate Z determined by the magnification determination unit 17 (step S07).

Figure 15:
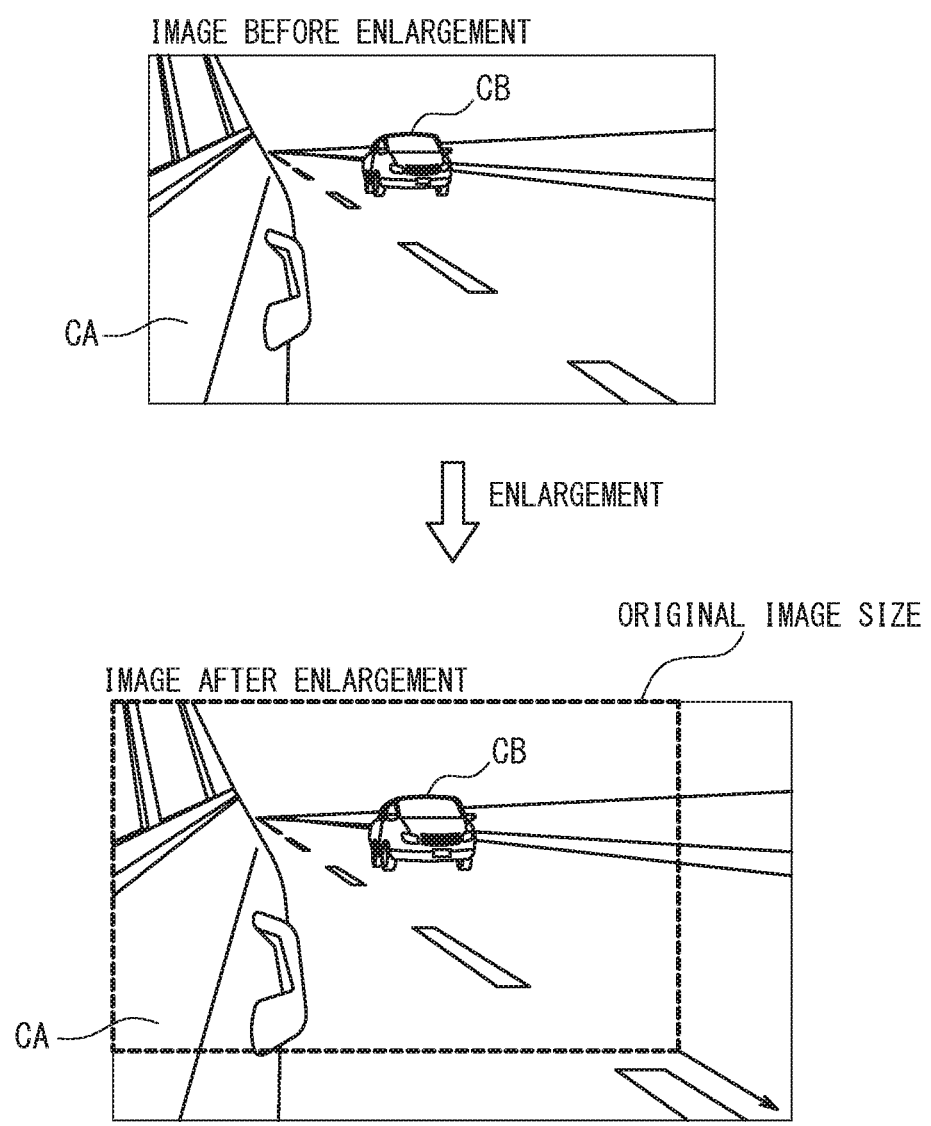
FIG. 15 is a diagram illustrating an enlargement processing to the image.

FIG. 15 is a diagram illustrating an image enlargement process. The size of the image before enlargement is indicated with a dotted line in the enlarged image. By enlarging the image, the other vehicle CB displayed in the image is also enlarged, and this is closer to the size of the other vehicle CB in the real-time image illustrated in FIG. 7B.

The trimming unit 19 trims the image enlarged by the enlargement unit 18 in accordance with the display area DA of the monitor 5 (step S08).

Figure 16:
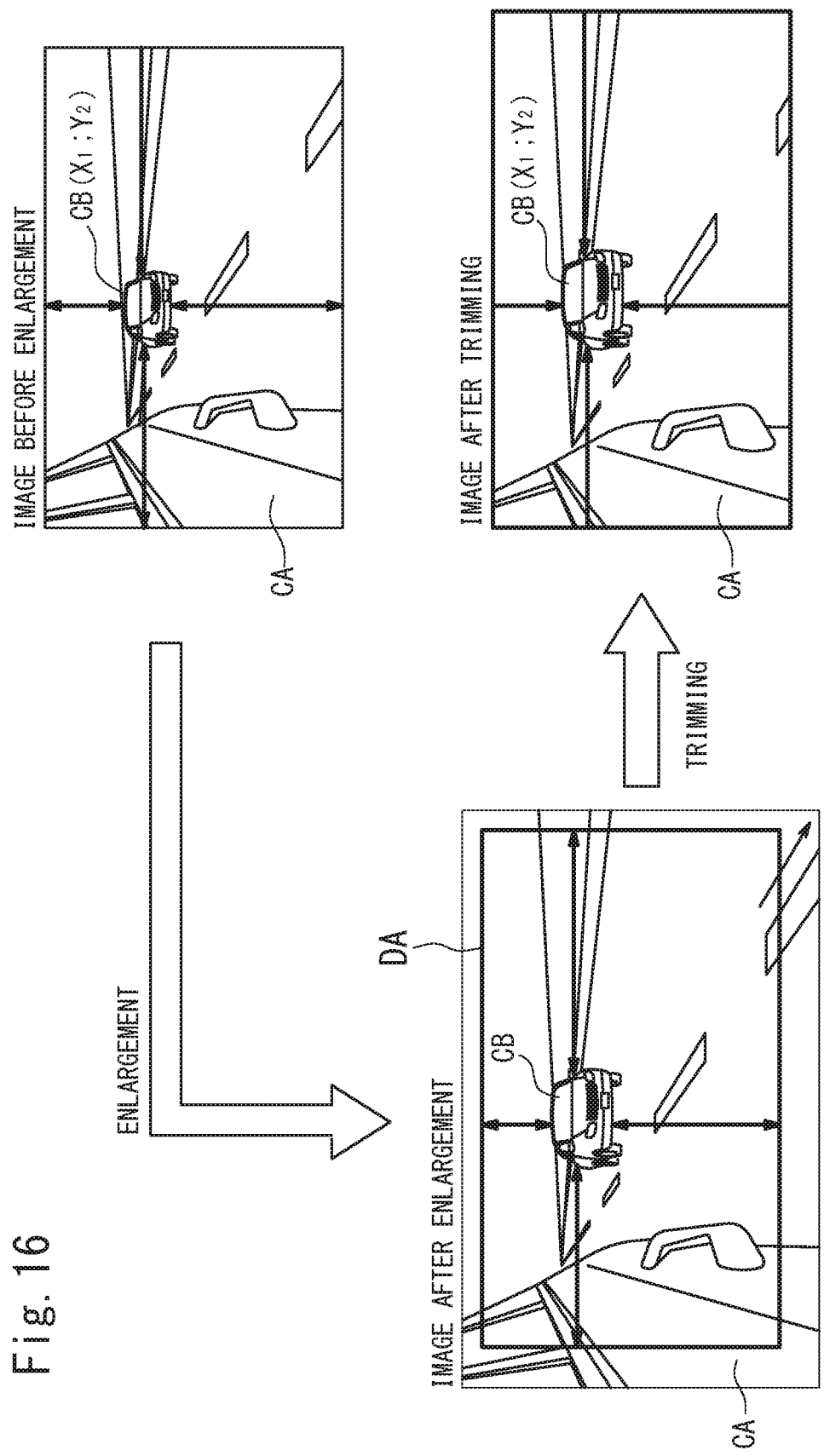
FIG. 16 is a diagram illustrating a trimming processing to the image.

FIG. 16 is a diagram illustrating an image trimming process. The trimming unit 19 trims the image enlarged by the enlargement unit 18 in accordance with the size of the display area DA of the monitor 5. As illustrated in FIG. 16, the trimming unit 19 sets the position of the other vehicle CB in the trimmed image to be the same as the position of the other vehicle CB in the image before enlargement. Specifically, the trimming unit 19 refers to the position $(X_1; Y_2)$ of the other vehicle CB detected by the vehicle detection unit 12, and in the image after trimming, determines the trimming range so that the other vehicle CB is located at the same position $(X_1; Y_2)$.

The output unit 20 outputs the image trimmed by the trimming unit 19 to the monitor 5 and allows the image to be displayed (step S09). During travel of the vehicle, the image display control device 1 continues the process of steps S01 to S09 described above, thereby enlarging the image in accordance with the approaching state of the other vehicle. Although the detailed description is omitted, the image display control device 1 may perform various kinds of image processing for appropriately displaying an image on the monitor 5 other than the above-described processing. For example, to align an image with a mirror image of a door mirror, a process for reversing the left and right of the image may be performed.

As described above, (1) the image display control device 1 according to the embodiment displays images of surroundings of the host vehicle CA in which the left camera 3 and the right camera 4 (cameras) installed in the host vehicle CA capture, on the monitor 5, and includes: a vehicle detection unit 12 that detects the other vehicle CB (another vehicle) from an image captured by the left camera 3 and the right camera 4; an enlargement unit 18 that perform enlargement processing on an image based on the delay time ΔTcd required for displaying the image captured by the left camera 3 and the right camera 4 on the monitor 5 when the vehicle detection unit 12 detects the other vehicle CB; and an output unit 20 that outputs an image obtained by the enlargement processing performed by the enlargement unit 18 to the monitor 5.

The image displayed by the monitor 5 is delayed to the real-time image due to the delay time ΔTcd required to the monitor 5 before displaying the image captured by the camera. In a state in which the other vehicle CB is approaching the host vehicle CA, the other vehicle CB in the delay image appears smaller than the real-time image. The driver checks the image of the monitor 5 at the time of an operation such as lane change, it is checked whether or not the other vehicle CB is approaching in the lane of the change destination. When the image displayed by the monitor 5 is a delay image, it is hard to grasp the degree of approach of the other vehicle CB. The image display control device 1 according to an embodiment enlarges the delay image based on the delay time ΔTcd, thereby making the size of the other vehicle CB to be displayed closer to the size of the real-time image. As a result, the driver can easily grasp the approaching state of the other vehicle CB, and the safety of the vehicle during driving can be improved.

(2) The image display control device 1 further includes a magnification determination unit 17 that determines a magnification rate Z used in the enlargement process of the enlargement unit 18 based on the delay time ΔTcd. The enlargement unit 18 enlarges the whole of the image at the magnification rate Z determined by the magnification determination unit 17. The image display control device 1 further includes a trimming unit 19 that trims an image enlarged by the enlargement unit 18 so as to be matched with the display area DA of the monitor 5.

Since the size of the other vehicle CB displayed in the image approaches the real-time image by enlarging the image, the size of the entire image also increases, accordingly the enlarged image can be appropriately displayed on the monitor 5 by performing trimming in accordance with the display area DA of the monitor 5.

(3) When trimming the image enlarged by the enlargement unit 18, the trimming unit 19 performs trimming of the other vehicle CB so that the position $(X_i; Y_i)$ of the other vehicle CB in the enlarged image to become equal to the position $(X_i; Y_i)$ before being enlarged by the enlargement unit 18. By adjusting the position of the other vehicle CB in the image before and after trimming, it is possible to display the other vehicle CB closer to the real-time image.

(4) The image display control device 1 further includes the distance measurement unit 13 which measures an inter-vehicle distance D between the host vehicle CA and the other vehicle CB, when the vehicle detection unit 12 detects the other vehicle CB in an image, and the relative velocity calculation unit 14 that calculates a relative velocity Vr of the other vehicle CB relative to the host vehicle CA based on the inter-vehicle distance D, and the magnification determination unit 17 enlarges the image based on the inter-vehicle distance D, the relative velocity Vr, and the delay time ΔTcd.

Since the approach of the other vehicle CB in the delay time ΔTcd varies according to the relative velocity Vr of the other vehicle CB, the magnification of the image also varies. Consequently, by obtaining the inter-vehicle distance D and the relative velocity in the distance measurement unit 13 and the relative velocity calculation unit 14, and determining the magnification rate Z based on these, the image of the other vehicle CB can be brought closer to the size of the real-time image.

(5) When the vehicle detection unit 12 detects a plurality of other vehicles CB and CD from an image, the distance measurement unit 13 measures the inter-vehicle distance D between the host vehicle equipped with the camera and one of the other vehicles CB at the position $(X_i)$ closest in a perpendicular direction to the traveling lane of. When the driver performs an operation such as lane change, attention is paid to the other vehicle CB traveling in the lane closest to the host vehicle CA. Thus, the vehicle detection unit 12 inputs, to the distance measurement unit 13, the information of the vehicle width W of the other vehicle CB at the position $(X_i)$ closest to the host vehicle CA in a direction orthogonal to the traveling direction. As a result, the image can be enlarged in accordance with the viewpoint of the driver.

(6) The left camera 3 and the right camera 4 are respectively installed on the left side (one side) and the right side (another side) of the vehicle. When the vehicle detection unit 12 detects other vehicles from images captured by respective cameras at the same timing, the magnification determination unit 17 determines the magnification rate Z for each image, and the enlargement unit 18 enlarges the images with the larger magnification rate Z.

In images captured by both the left camera 3 and the right camera 4 at the same timing, when the vehicle detection unit 12 detects different other vehicles, the magnification determination unit 17 calculates different magnifications for the left and right images. In this case, by using the larger magnification rate Z, it is possible to prevent the sense of incongruity of the driver caused by a different magnification rate of the left and right images. Further, by selecting the larger magnification rate Z, the images are enlarged in accordance with the other vehicle closer to the host vehicle CA, so that the safety during operation can be improved.

(7) The image display control device 1 further includes a delay time determination unit 16 that determines the delay time ΔTcd based on the temperature of the liquid crystal display 50 of the monitor 5. The response time Trs until the target brightness is reached differs depending on the temperature of the liquid crystal display 50. Therefore, by determining the delay time ΔTcd based on the temperature of the liquid crystal display 50, the magnification rate Z of the image can be determined more appropriately.

Modified Example 1

In the embodiment described above, the enlargement unit 18 enlarges the entire image as the enlargement process of the image, but the present invention is not limited to this. For example, the enlargement unit 18 may enlarge only the other vehicle CB displayed in the image as the enlargement process of the image.

Figure 17:
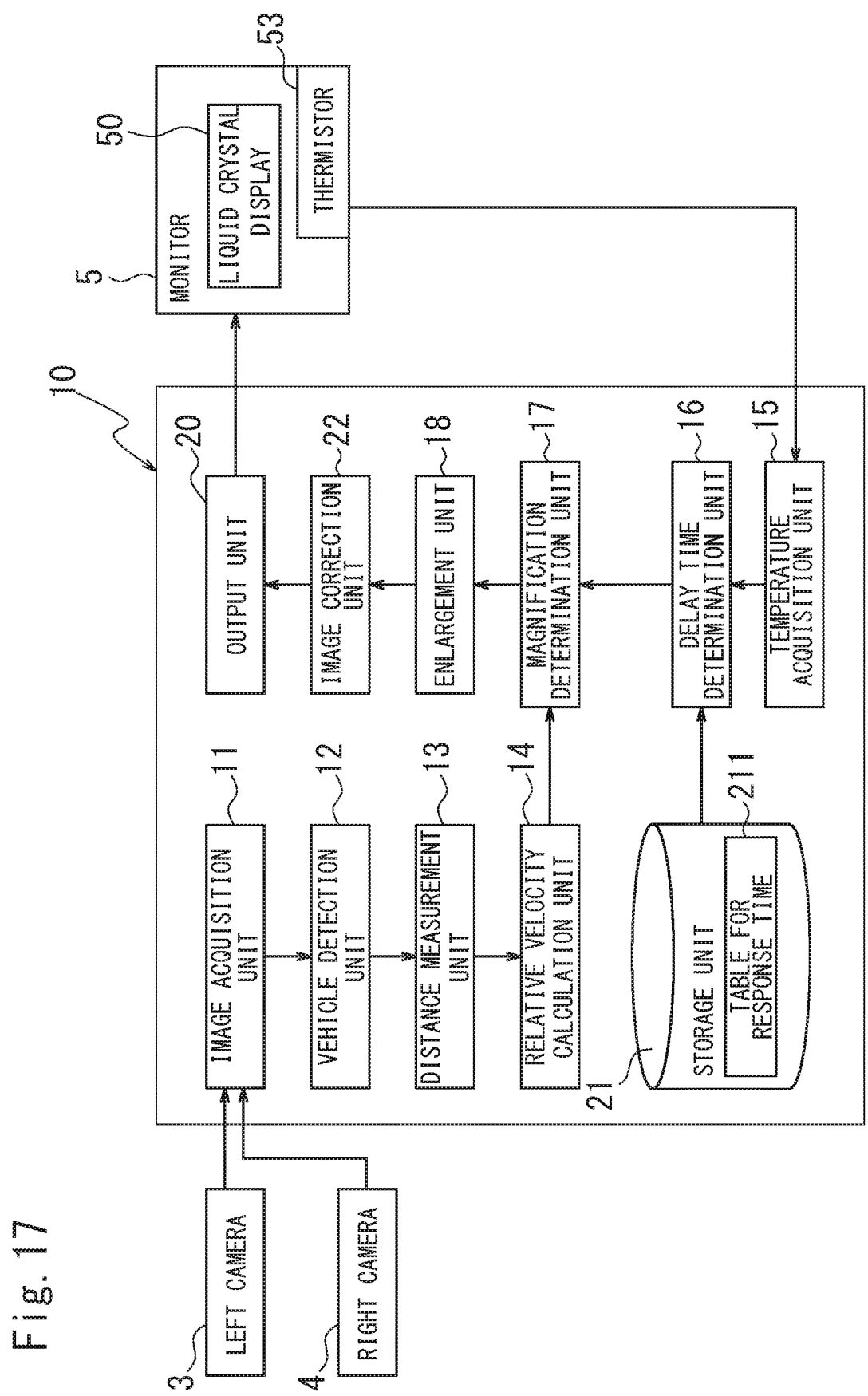
FIG. 17 is a block diagram illustrating a configuration of the image display control device according to Modified Example 1.

FIG. 17 is a block diagram illustrating a configuration of the image display control device 10 according to Modified Example 1.

As illustrated in FIG. 17, the image display control device 10 of Modified Example 1 has an image correction unit 22 instead of the trimming unit 19 of the image display control device 1 (see FIG. 1) of the embodiment. Other configurations are similar to those of the image display control device 1 of the embodiment, and a detailed description thereof is omitted.

In Modified Example 1, as the enlargement process of the image, the enlargement unit 18 enlarges the other vehicle CB displayed in the image acquired by the image acquisition unit 11 with the magnification rate Z determined by the magnification determination unit 17. In an image, the enlargement unit 18 replaces the other vehicle CB before being enlarged with the enlarged the other vehicle CB. The image correction unit 22 performs image correction on the image output by the enlargement process performed by the enlargement unit 18.

Figure 18:
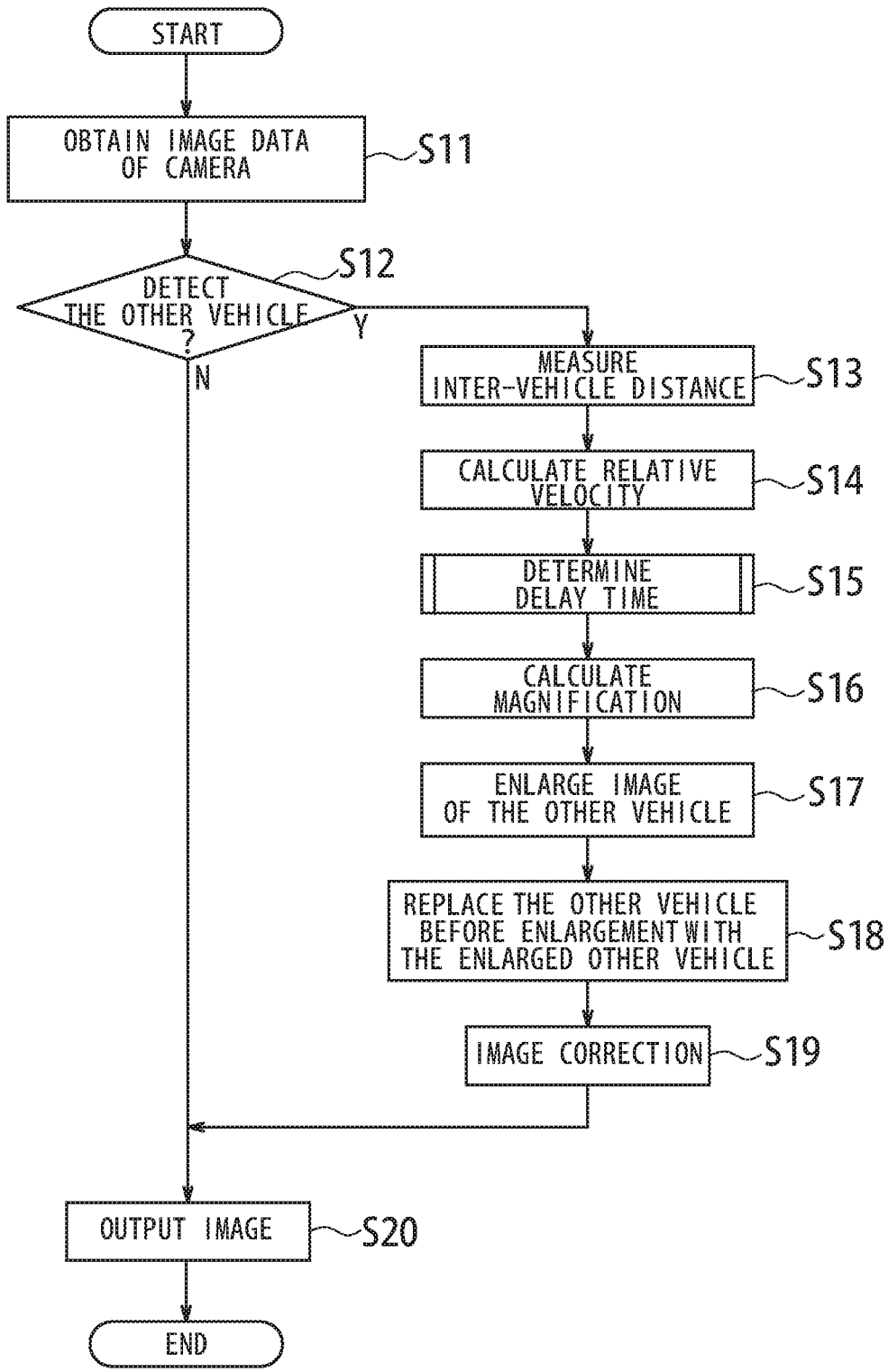
FIG. 18 is a flowchart illustrating a processing to be performed by the image display control device according to Modified Example 1.
Figure 19A:
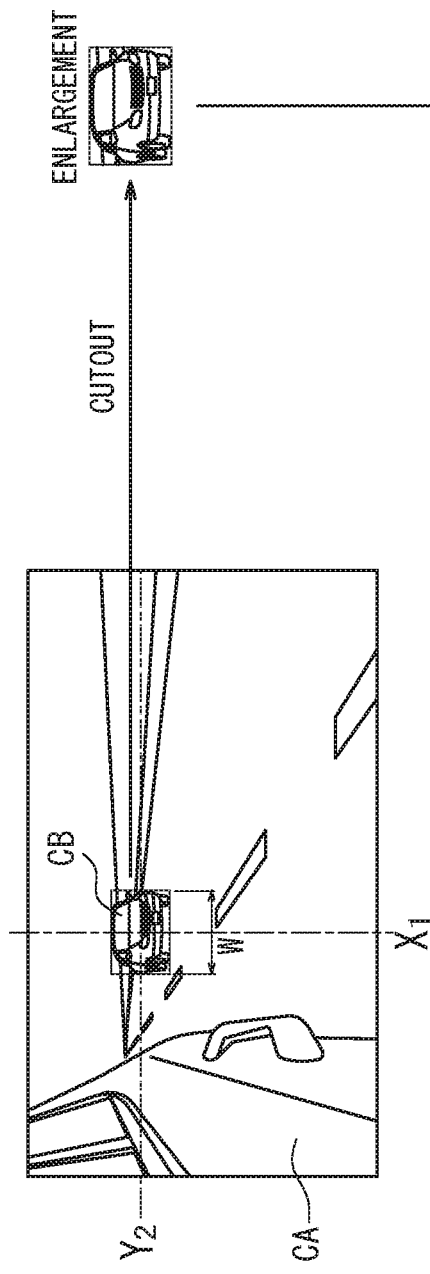
FIGS. 19A and 19B are diagrams illustrating an enlargement processing of Modified Example 1.
Figure 19B:
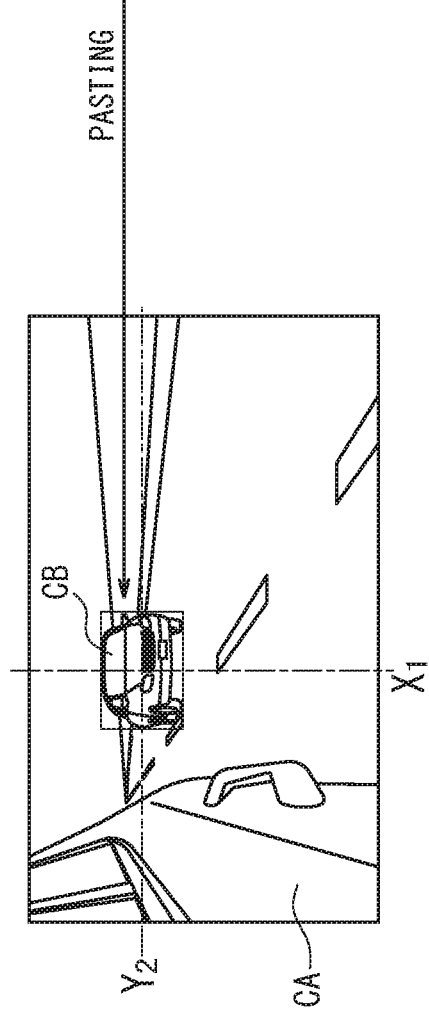

FIG. 18 is a flowchart illustrating a process performed by the image display control device 10 according to Modified Example 1. FIGS. 19A and 19B are diagrams illustrating an enlargement process of Modified Example 1. Steps S11 to S16 in FIG. 18 are the same as the steps S01 to S06 in FIG. 5, and a description thereof are omitted.

As illustrated in FIG. 18, the enlargement unit 18 enlarges the other vehicle CB displayed in the image acquired by the image acquisition unit 11 with the magnification rate Z determined by the magnification determination unit 17 (step S17). As illustrated in FIGS. 19A and 19B, the enlargement unit 18 cuts out a part of the other vehicle CB from the image. The enlargement unit 18 cuts out an area including the other vehicle CB by using, for example, the information of the width W and the position $(X_1; Y_2)$ of the other vehicle CB, in which the vehicle detection unit 12 detects. When performing cutting, portion around the other vehicle CB may be also cut out. The enlargement unit 18 enlarges a part cut out from the image with a magnification rate Z.

The enlargement unit 18 replaces the image of the other vehicle CB before enlargement with the enlarged image of the other vehicle CB (step S18). The enlargement unit 18 performs replacement by attaching the enlarged image of the other vehicle CB to the image of the other vehicle CB before the enlargement. As illustrated in FIGS. 19A and 19B, the enlargement unit 18 refers to the position of the other vehicle CB as the detection result of the vehicle detection unit 12, that is, the center position $(X_1; Y_2)$ of the other vehicle CB in the image before enlargement. The enlargement unit 18 attaches the center position of the other vehicle CB in the area cut out and enlarged in step S17 to the center position $(X_1; Y_2)$ of the original the other vehicle CB. The enlargement unit 18 outputs the enlarged image to the image correction unit 22.

The image correction unit 22 performs image correction to the image input by the enlargement unit 18 (step S19).

FIG. 20 is a diagram for describing image correction by the image correction unit 22.

FIG. 20 illustrates a portion of the vehicle CB of the image input by the enlargement unit 18.

Since in the image subjected to the enlargement process by the enlargement unit 18, only an area of the other vehicle CB is enlarged, the number of pixels in the area of the other vehicle CB is decreased, consequently the image becomes rougher as compared with another area. The image correction unit 22 performs a correction process of reducing difference in image quality between the area of the other vehicle CB and other area in the image. The correction processing can appropriately select a known method, and for example, a super-resolution technique is used to interpolate pixels of the area of the other vehicle CB in accordance with other area. As a result, as illustrated in FIG. 20, the area of the other vehicle CB becomes clear and becomes an image that is easily grasped by the driver.

The output unit 20 outputs the image corrected by the image correction unit 22 to the monitor 5 to be displayed (step S20).

As described above, in the image display control device 10 according to Modified Example 1, (8) the enlargement unit 18 enlarges the other vehicle CB displayed in the image with the magnification rate Z determined by the magnification determination unit 17, and in an image, replaces the displayed image of the other vehicle CB before enlargement with an enlarged image of the other vehicle CB. When only the area of the other vehicle CB is enlarged in the image, for example, the image of the host vehicle CA displayed in the image is not enlarged. This allows the driver to concentrate in viewing the image when viewing the image, this makes it easy to grasp the approach of the other vehicle CB, and it is possible to improve safety during driving of the vehicle.

(9) the enlargement unit 18 replaces the displayed imaged of the other vehicle CB in the image before enlargement with the enlarged image of the other vehicle CB so that a center of the enlarged image is aligned with a center of the other vehicle CB before enlargement. As a result, there is no missing portion from the original image, and a process of filling the missing portion is not necessary.

The image correction by the image correction unit 22 described in Modified Example 1 may be performed after the enlargement process and the trimming of the entire image described in the embodiment. The image after the trimming becomes rougher because the number of pixels is smaller than that of an image not subjected to the enlargement process. The difference in image quality between an image before and after enlargement process is reduced by interpolating pixels of the entire image after trimming in accordance with an image before enlargement process, an image that is easily grasped by the driver can be obtained.

Modified Example 2

In the above embodiment, an example in which the image display control device 1 enlarges the images of the camera installed in the left and right front doors has been described, but the present invention is not limited thereto. For example, a camera for capturing a rear side of a vehicle is provided to a rear glass of a vehicle, the image display control device 1 may perform the above-described processing on an image of the camera. The monitor 5 is also not limited to the example installed in the dashboard of the driver seat. For example, a rearview mirror installed in an upper portion between a driver seat and a passenger seat in the vehicle may be replaced with a monitor 5.

Modified Example 3

In the above-described embodiment, the delay time determination unit 16 calculates the delay time $\Delta Tcd$ in consideration of the response time Trs of the liquid crystal display 50 that varies according to the temperature, but the present invention is not limited thereto. For example, the delay time determination unit 16 may not be prepared in the image display control device 1, and the fixed delay time $\Delta Tcd$ may be stored in the storage unit 21 in advance. For example, when using a liquid crystal display 50 in which variation in the response time Trs due to the temperature is small, or when the vehicle travels in an environment in which the temperature variation is small, the response time Trs may be set to a fixed value. Then since both the transmission time Ttr and the response time Trs are fixed values, the delay time $\Delta Tcd$ also becomes a fixed value. The magnification determination unit 17 may perform calculation using the delay time $\Delta Tcd$ of the fixed value to determine the magnification rate Z.

Modified Example 4

In the above embodiment, the distance measurement unit 13 and the relative velocity calculation unit 14 calculate the inter-vehicle distance D and the relative velocity Vr of the other vehicle CB relative to the host vehicle CA, and the magnification determination unit 17 calculates the magnification rate Z using these, but not limited thereto. If the distance measurement unit 13 and the relative velocity calculation unit 14 are not prepared in the image display control device 1, and the magnification determination unit 17 determines that the other vehicle CB is approaching the host vehicle CA, the image may be enlarged with a specific magnification.

The approach of the other vehicle may be determined, for example, by the vehicle detection unit 12. For example, the vehicle detection unit 12 compares a vehicle width W1 measured in an image with a vehicle width W2 measured in one frame previous image. If the vehicle width W1 is larger than the vehicle width W2, the vehicle detection unit 12 determines that the other vehicle CB is approaching the host vehicle CA. The specific magnification is determined in advance and stored in the storage unit 21. Similarly to the embodiment, when the delay time determination unit 16 determines the delay time $\Delta Tcd$, a plurality of magnifications corresponding to the delay time $\Delta Tcd$ may be determined in advance. Alternatively, when the delay time $\Delta Tcd$ of the fixed value is used as in Modified Example 1, only one magnification may be determined.

Modified Example 5

In the embodiment described above, the distance measurement unit 13 calculates the inter-vehicle distance D between the host vehicle CA and the other vehicle CB by performing the calculation of Equation (1) using the vehicle width W in the image, but not limited thereto. For example, a sensor such as a laser radar or a millimeter-wave radar may be used to measure the inter-vehicle distance to the other vehicle CB.

REFERENCE SIGNS LIST

1, 10 image display control devices
3 left camera (Camera)
4 right camera (Camera)
5 monitor
11 image acquisition unit
12 vehicle detection unit
13 distance measurement unit
14 relative velocity calculation unit
15 temperature acquisition unit
16 delay time determination unit
17 magnification determination unit
18 enlargement unit
19 trimming unit
20 output unit
21 storage unit
22 image correction unit
50 liquid crystal display
51 LED backlight board
52 LED
53 thermistor
211 table for response time
CA host vehicle (vehicle equipped with camera)
CB and CD other vehicles (vehicles other than host vehicle)
DA display area
L lane line

The invention claimed is:

1. An image display control device that displays images of surroundings of a host vehicle on a monitor, the images being captured by one or more cameras installed in the host vehicle, the image display control device configured to:
  detect
    an other vehicle in an image captured by a camera of the one or more cameras;
  when the other vehicle approaches the host vehicle equipped with the camera, apply an enlargement processing to the image to obtain an enlarged image based on a delay time required for displaying the image captured by the camera on the monitor; and
  output to the monitor the enlarged image,
    the image display control device further configured to:
      based on the delay time, determine a magnification rate used for the enlargement processing,
      wherein to apply the enlargement processing to the image based on the delay time required for displaying the image captured by the camera on the monitor comprises to:
        enlarge at least an area of the image at the magnification rate, wherein the image display control device further configured to:
  trim the enlarged image so as to be matched with a display area of the monitor, wherein to trim the enlarged image so as to be matched with the display area of the monitor comprises to:
    cause a position of the other vehicle in the enlarged image to become equal to a position of the other vehicle in the image before being enlarged.

2. The image display control device according to claim 1, wherein the at least the area of the image is a whole of the image.

3. The image display control device according to claim 1, wherein the at least the area of the image is an area of a whole of the image that is smaller than the whole of the image.

4. The image display control device according to claim 1, further configured to:
  measure an inter-vehicle distance between the host vehicle equipped with the camera and the other vehicle, when the other vehicle is detected from the image; and
  based on the inter-vehicle distance, calculate relative velocity of the other vehicle with respect to the host vehicle equipped with the camera,
  wherein the magnification rate used for the enlargement processing is based on the inter-vehicle distance, the relative velocity, and the delay time.

5. The image display control device according to claim 4, further configured to:
  when a plurality of other vehicles are detected from the image, measure an inter-vehicle distance between the host vehicle equipped with the camera and one of other vehicles positioned closest to the host vehicle in a direction orthogonal to a traveling direction thereof.

6. The image display control device according to claim 1, further to:
  determine the delay time based on a temperature of a liquid crystal display included in the monitor.

7. An image display control device that displays images of surroundings of a host vehicle on a monitor, the images being captured by one or more cameras installed in the host vehicle, the image display control device configured to:
  detect an other vehicle in an image captured by a camera of the one or more cameras;
  when the other vehicle approaches the host vehicle equipped with the camera, apply an enlargement processing to the image to obtain an enlarged image based on a delay time required for displaying the image captured by the camera on the monitor; and
  output to the monitor the enlarged image,
  the image display control device further configured to:
    based on the delay time, determine a magnification rate used for the enlargement processing,
    wherein to apply the enlargement processing to the image to obtain the enlarged image comprises to:
    identify an area of the image including the other vehicle;
    enlarge the area at the magnification rate to obtain an enlarged area; and
    replace the area in the image with the enlarged area to obtain the enlarged image.

8. The image display control device according to claim 7, wherein to apply the enlargement processing to the image to obtain the enlarged image further comprises to:
  replace the area including the other vehicle in the image with the enlarged area so that a first center of the enlarged area is aligned with a second center of the area before enlargement to obtain the enlarged image.

9. The image display control device according to claim 7, further configured to:
  measure an inter-vehicle distance between the host vehicle equipped with the camera and the other vehicle, when the other vehicle is detected from the image; and
  based on the inter-vehicle distance, calculate relative velocity of the other vehicle with respect to the host vehicle equipped with the camera,
  wherein the magnification rate used for the enlargement processing is based on the inter-vehicle distance, the relative velocity, and the delay time.

10. The image display control device according to claim 9, further configured to:
  when a plurality of other vehicles are detected from the image, measure an inter-vehicle distance between the host vehicle equipped with the camera and one of other vehicles positioned closest to the host vehicle in a direction orthogonal to a traveling direction thereof.

11. The image display control device according to claim 7, further to:
  determine the delay time based on a temperature of a liquid crystal display included in the monitor.

12. An image display control device that displays images of surroundings of a host vehicle on a monitor, the images being captured by a camera installed in the host vehicle, the image display control device configured to:
  detect an other vehicle in an image captured by the camera;
  when the other vehicle approaches the host vehicle equipped with the camera, apply an enlargement processing to the image to obtain an enlarged image based on a delay time required for displaying the image captured by the camera on the monitor; and
  output to the monitor the enlarged image,
  the image display control device further configured to:
    based on the delay time, determine a magnification rate used for the enlargement processing,
    wherein respective cameras, including the camera, are installed at one side and the other side of the host vehicle, and
    wherein the image display control device further configured to:
      when other vehicles are detected from images captured by the respective cameras at a same timing, determine the magnification rate for each of the images captured by the respective cameras, and apply the enlargement processing to the images based on larger magnification rate.

13. The image display control device according to claim 12, further configured to:
  measure an inter-vehicle distance between the host vehicle equipped with the camera and the other vehicle, when the other vehicle is detected from the image; and
  based on the inter-vehicle distance, calculate relative velocity of the other vehicle with respect to the host vehicle equipped with the camera,
  wherein the magnification rate used for the enlargement processing is based on the inter-vehicle distance, the relative velocity, and the delay time.

14. The image display control device according to claim 13, further configured to:
  when a plurality of other vehicles are detected from the image, measure an inter-vehicle distance between the host vehicle equipped with the camera and one of other vehicles positioned closest to the host vehicle in a direction orthogonal to a traveling direction thereof.

15. The image display control device according to claim 12, further to:
determine the delay time based on a temperature of a liquid crystal display included in the monitor.

* * * * *